(12) United States Patent
Krantz (10) Patent No.: US 6,493,954 B1
(45) Date of Patent: Dec. 17, 2002

(54) FLUID-ACTUATED LEVEL DEVICE

(75) Inventor: Norman L. Krantz, San Jose, CA (US)

(73) Assignee: Zircon Corporation, Campbell, CA (US)

( * ) Notice: Subject to any disclaimer, the term of this patent is extended or adjusted under 35 U.S.C. 154(b) by 0 days.

(21) Appl. No.: 09/637,478

(22) Filed: Aug. 11, 2000

(51) Int. Cl.$^7$ ................................................ G01C 5/04
(52) U.S. Cl. ........................................................ 33/367
(58) Field of Search .......................................... 33/367

(56) References Cited

U.S. PATENT DOCUMENTS

| | | | | |
|---|---|---|---|---|
| 3,118,088 A | * | 1/1964 | Hanson | 33/367 |
| 4,434,561 A | | 3/1984 | Gaspar | 33/367 |
| 4,567,669 A | * | 2/1986 | Francis | 33/367 |
| 4,669,484 A | * | 6/1987 | Masters | 33/367 |
| 5,313,713 A | * | 5/1994 | Heger et al. | 33/343 |
| 5,452,522 A | * | 9/1995 | Kook et al. | 33/418 |
| 5,488,779 A | * | 2/1996 | Schultheis et al. | 33/366.27 |
| 5,594,669 A | * | 1/1997 | Heger | 33/343 |

FOREIGN PATENT DOCUMENTS

| | | | | |
|---|---|---|---|---|
| DE | 3742001 A1 | * | 6/1989 | 33/367 |
| JP | 0001905 A | * | 1/1989 | 33/367 |

OTHER PUBLICATIONS

Press News, www.Stanleyworks.com/pressnews/compu-.htm, unknown date, but prior to Aug. 11, 2000, 1 page. "Compulevel".
Zircon Corporation, Electralevel™ 3.0, Technical Information, 4/97, 1 page.
Zircon Corporation, Electralevel™ 4.0, Technical Information, 4/97, 1 page.
Zircon Corporation, Electralevel™, Technical Information, 10/99, 1 page.
Zircon Corporation, Electralevel™ PRO, Technical Information, 2/00, 1 page.
Baseball Waterballoons, www.waterballoonlaunchers.com/baseball.htm, unknown date, but prior to Aug. 11, 2000, 1 page.

* cited by examiner

Primary Examiner—Christopher W. Fulton
(74) Attorney, Agent, or Firm—Skjerven Morrill LLP; Norman R. Klivans (57) ABSTRACT

A fluid-actuated level device for use, for instance, in the building trades, discovers points lying on a horizontal plane with a reference point. The level device has a tube with a referenceend and a working-end, and a housing unit attached to the reference-end. Electrodes in the housing unit measure fluid-levels in the reference-end. When the fluid-level in the working-end is positioned in the horizontal plane containing the reference point, then the level device emits a signal; in one embodiment, this signal is a single continuous sound. When the working-end is positioned slightly higher than the reference point, a second signal is emitted; in one embodiment, this signal is an intermittent sound. The second intermittent sound notifies the worker that the fluid-level in the working-end is too high relative to the reference plane, i.e., the worker has "overshot" the reference plane. Also provided are embodiments having a tube window, an alignment window, and a slidable backing assembly. The tube window provides visual access to the electrodes in the tube. The alignment window enables the reference markers to be in close proximity on adjacent sides of the tube at the reference-end. A slidable backing assembly enables the housing unit to be slidably adjusted along a continuous vertical line after it is affixed to a reference point. Lastly, a method for using a non-transparent tube is provided.

15 Claims, 9 Drawing Sheets

| Quantity | Reference Number | Value | Description |
|---|---|---|---|
| 1 | C3 | 1000pF | Radial |
| 5 | D1-5 | 1N4148 | Diode |
| 3 | R2 R4 R11 | 470K | Resistor |
| 4 | R6-9 | 3.3M | Resistor |
| 2 | R1 R3 | 10K | Resistor |
| 1 | B2 | 9 Volt | Battery Cable |
| 1 | C1 | 22$\mu$F | Electrolytic, Radial |
| 3 | P1-3 | | Pin |
| 1 | B1 | | Buzzer |
| 1 | U1 | CD40106 | HEX SCHMITT TRIGGER |
| 1 | C2 | 0.1$\mu$F | Axial |
| 1 | R5 | 1M | Resistor |
| 1 | C4 | 22pF | Radial, 0.1LS |
| 1 | SW1 | | 2 Pos. Slide Switch |

FLUID-ACTUATED LEVEL DEVICE

FIELD OF THE INVENTION

The present disclosure relates generally to devices used in identifying two or more points on a horizontal plane, specifically, a fluid-actuated level device for locating points on a level plane.

BACKGROUND

Numerous level devices have been used to identify points on a horizontal plane. Level devices are particularly useful in the building industries where positioning a structure on a level plane is critical to the design and implementation of the structure. Such structures include, for example, foundations, decks, counter-tops, suspended ceilings, suspended sprinkler systems, pools, fences, and sewer lines. Two level devices are commonly used in the building industries: bubble levels and fluid-actuated levels. Bubble levels are well-known in the prior art. Two types of fluid-actuated levels are generally known in the prior art. Both types operate according to the same general principle: if fluid is allowed to flow through a tube and the end of the tube are raised above the body of the tube, then gravity pulls the fluid such that the fluid-levels at the tube ends settle on the same horizontal plane. The first type of fluid-actuated level generally consists of a sealed tube with a pressure-sensing device connected to a tube end for measuring air pressure in an air cavity at the tube end. The pressure varies with the displacement in air volume at the tube ends caused by the gravitational pull on the fluid; the sensing device may thus be calibrated to a particular air pressure, typically a pressure corresponding to when the fluid-levels in the two ends lie on a horizontal plane. One drawback of the pressure-sensitive fluid-actuated level is its cost, which is often prohibitive for commonplace construction applications.

Figure 1:
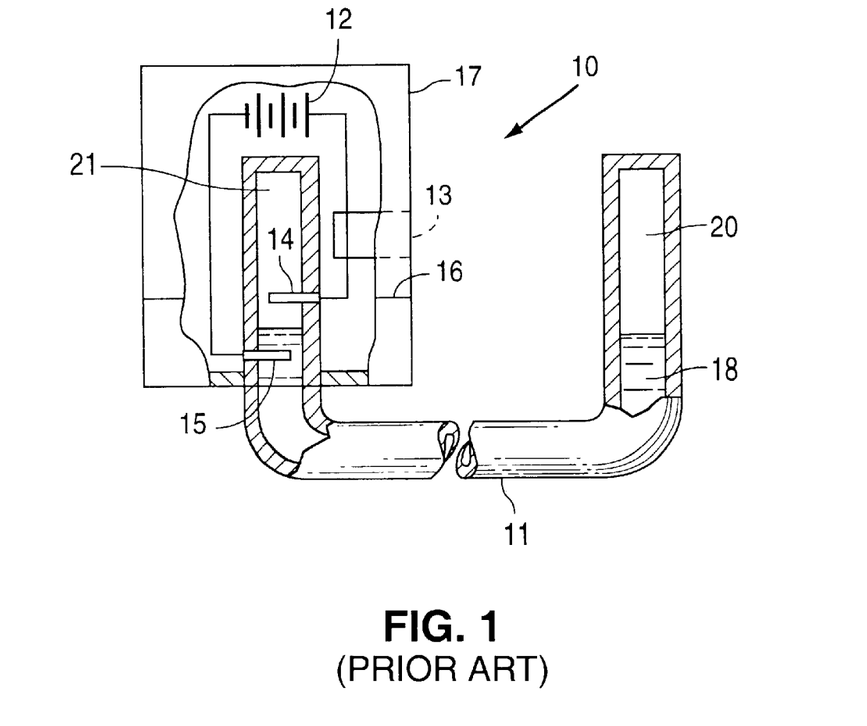
FIG. 1 illustrates a prior art fluid-actuated level device.

The second type of fluid-actuated level (generally less costly than the first type) typically uses a fluid-level sensing device connected to an end of an unsealed tube. A fluid-actuated level of this type is disclosed in U.S. Pat. No. 4,434,561 and shown in FIGS. 1–2. In FIG. 1, fluid-actuated level device 10 has a housing unit 17 and a tube 11 for holding an electrically conducting fluid 18, typically tap water. Tube 11 has a reference-end 21, connected to the housing unit 17, and a working-end 20. Working-end 20 is used by a worker for locating level points in a proposed horizontal plane, or reference plane. Housing unit 17 has a base electrode 15 and a reference electrode 14 inserted through the walls of the reference-end 21 for detecting the fluid-level in the tube 11. Electrodes 14, 15 are connected to a power source 12 and a signal generator 13, such as a sound or light generator, and form a circuit when connected. In operation, conducting fluid 18 in reference-end 21 submerges base electrode 15. When a worker lifts the fluid-level in working-end 20 higher, the fluid level in reference-end 21 rises to make contact with reference electrode 14. When conductive fluid 18 contacts reference electrode 14, an electrical circuit is formed which enables current from electrical source 12 to actuate signal generator 13. Signal generator 13 then emits a sound, light or other signal to indicate that the fluid-level in the working-end 20 has contacted the reference plane as defined by the reference electrode 14; this signal will be called the reference signal. In the prior art, housing unit 17 conceals electrodes 14, 15 and reference-end 21; external reference marking 16, which is aligned with the reference electrode 14, is therefore placed on the outside of housing unit 17 to indicate the reference plane to the worker.

Figure 2:
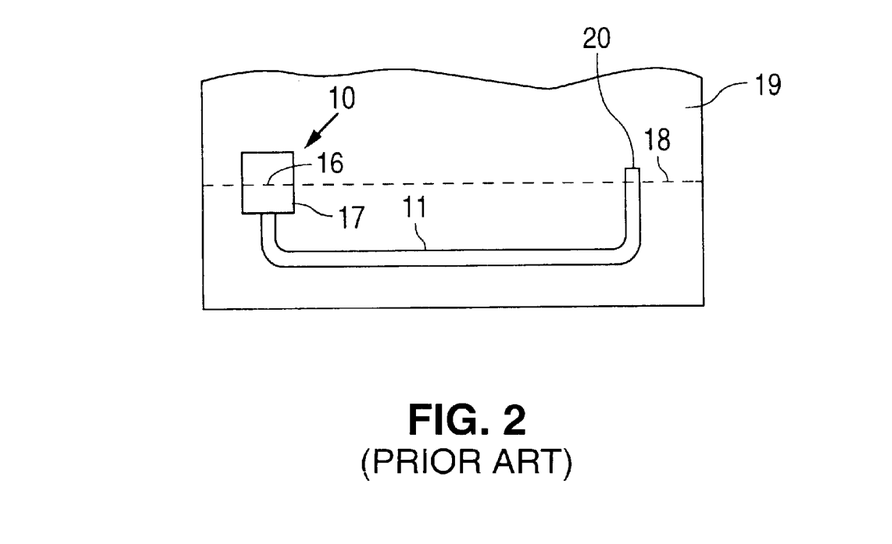
FIG. 2 illustrates the general operation of a prior art fluid-actuated level device.

FIG. 2 illustrates the general operation of fluid-actuated level device 10. A worker fills tube 11 of fluid-actuated level 10 with fluid and affixes housing unit 17 to, for example, a wall 19. Housing unit 17 is affixed such that external reference marking 16 is aligned with the proposed reference plane 18 (shown as a dotted-line). Working-end 20 (opposite housing unit 17) is shown extended across the wall 19; the water-level in working-end 20 is aligned with reference plane 18. To discover the reference plane, the worker moves working-end 20 upward until the fluid-level in the working-end 20 reaches the same height as the external reference marking 16 on housing unit 17. Due to the action of gravity on the fluid in tube 11 (the body of the tube 11 must be positioned below the tube ends), the fluid within housing unit 17 at this point has submerged base electrode 15 and reference electrode 14; this completes a circuit that activates signal generator 13. The worker hears a reference signal which indicates the level point. In this manner, the working-end 20 may be used to locate a multitude of level points lying on a reference plane roughly defined by a circle centered on housing unit 17 with a radius equal to the tube length. Level points approximately 100 feet from housing unit 17 may be accurately discovered in this manner. The fluid-actuated device of FIGS. 1–2 is especially useful when level points are sought by a worker working alone in rough and un-even terrain, or, for example, where level points need to be discovered around a corner structure. In this case, the worker takes working-end 20 around the corner structure and moves working-end 20 in a vertical manner until a reference signal is heard from housing unit 17.

The fluid-actuated level device of FIGS. 1–2 has a number of limitations. First, the level device 10 does not communicate to the worker whether the fluid-level in the working-end 20 is positioned too high; on the contrary, a single reference signal is given so long as the fluid-level in the working end is either in the reference plane or at any point above the reference plane. This introduces imprecision when a worker, due to, e.g., fatigue or rough terrain, accidentally adjusts the working-end too high after hearing the signal emitted from the device. Second, normal usage of the level device 10 results in dirt and fluid residue accumulation around the electrodes 14, 15 in the tube; this may result in a "wicking" effect. Wicking is caused when fluid clings to the dirt and fluid residue around the electrodes to form a conductive bridge between the probes that persists beyond the point at which the fluid-level, under normal conditions, would disconnect the electrodes 14, 15. In the prior art, a worker is unable to efficiently detect a possible wicking condition because visual access to the tube 11 and the electrodes 14 15 is not provided. Third, a worker typically affixes the housing unit 17 to a reference plane by aligning a single external reference marking 16 on the outer edge of housing unit 17 to the reference point. Housing unit, however, has a greater width than the tube 11, and therefore any skew or tilt introduced to the housing unit 17 when affixing it (or using it) results in a degree of imprecision equal to the distance between the horizontal planes defined by the reference plane and the external reference marking 16 (the greater the distance, the greater the degree of potential imprecision).

Fourth, housing unit 17 is typically affixed by driving nails or screws for attaching the housing unit 17 into a structure. This often results in imprecision because the nail or screw is driven at an awkward angle due to a lack of care by the worker or by irregularities in the structural medium (e.g., a knot in wood). Because readjustment is typically burdensome (requiring removal and replacement of the nail or screw), such imprecision is typically tolerated. Lastly, the tube ends should generally consist of transparent or otherwise translucent material to enable the worker to view the fluid-levels; as a result, the entire tube is typically constructed of a single molded piece of transparent plastic. Because the tube may be in excess of one-hundred feet long, the cost of transparent tubing may be significant.

SUMMARY

A fluid-actuated level device (hereafter, "level device") for use, for instance, in the building trades, is disclosed. The level device enables a worker to discover points lying on a horizontal plane defined by a reference point. The level device has a tube with a reference-end and a working-end, and a housing unit attached to the reference-end. Electrodes in the housing unit measure fluid-levels in the reference-end. When the fluid-level in the working-end is positioned in the horizontal plane containing the reference point, then the level device emits a signal; in one embodiment, this signal is a single continuous sound. When the working-end is positioned slightly higher than the reference point, a second signal is emitted; in one embodiment, this signal is an intermittent sound. The second intermittent sound notifies the worker that the fluid-level in the working-end is too high relative to the reference plane, i.e., the worker has "overshot" the reference plane. Also provided are embodiments having a tube window, an alignment window, and a slidable backing assembly. The tube window provides visual access to the electrodes in the tube. The alignment window enables the reference markers to be in close proximity on adjacent sides of the tube at the reference-end. A slidable backing assembly enables the housing unit to be slidably adjusted along a continuous vertical line after it is affixed to a reference point. Lastly, a method for using a non-transparent tube is provided.

DETAILED DESCRIPTION

Figure 3:
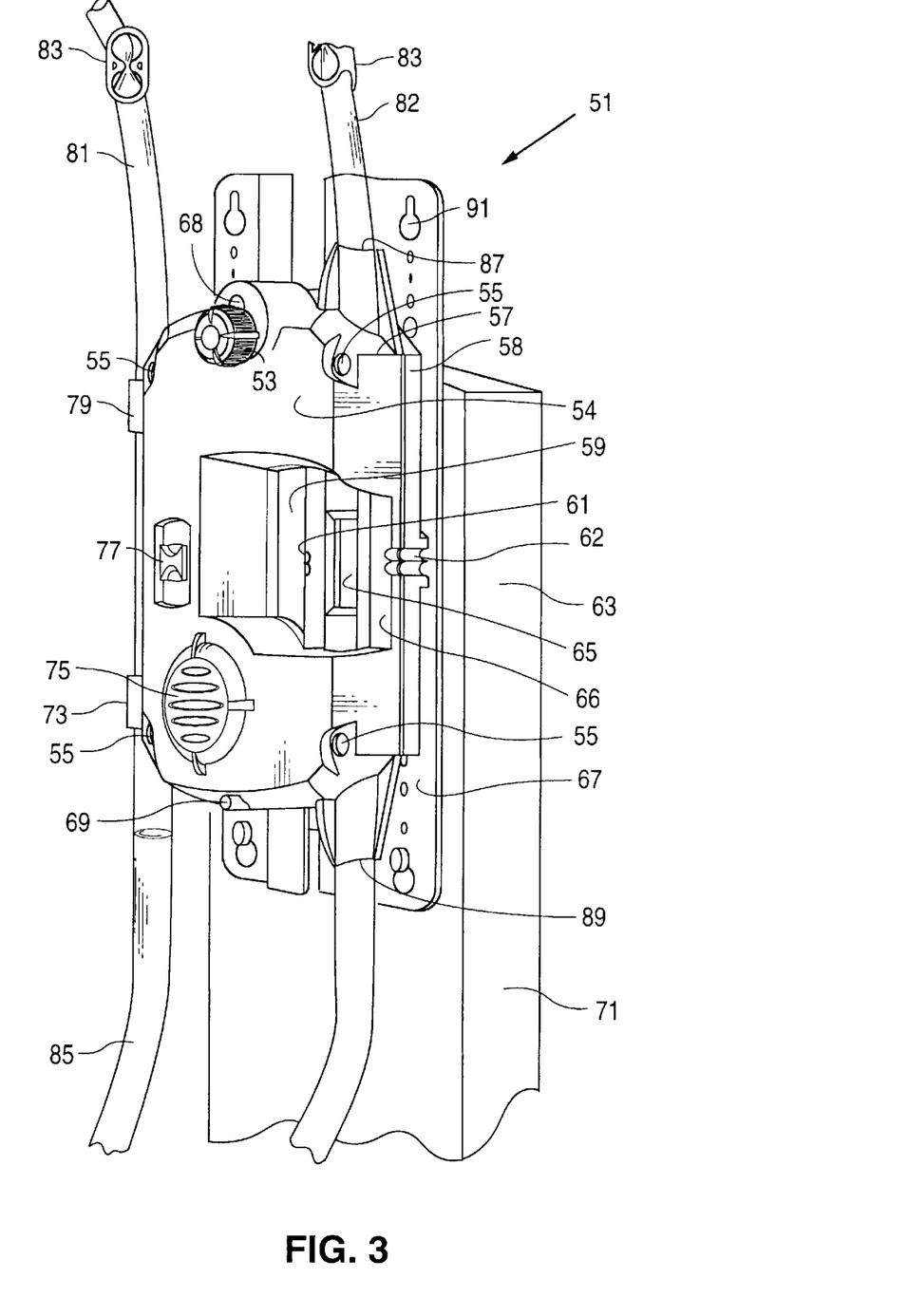
FIG. 3 illustrates a fluid-actuated level device according to one embodiment.

FIG. 3 illustrates a fluid-actuated level device 51 according to one embodiment. Housing unit 54 comprises a molded plastic exterior consisting of a molded cover component 57 connected by four screws 55 to a molded backing component 58. Housing unit 54 has an alignment window 59 located roughly in the center of molded cover and backing components 57, 58. Tube channel structure 66 comprises the right longitudinal section of housing unit 54 adjacent to the right edge of alignment window 59; a cylindrical tube channel runs inside tube channel structure 66 from bottom tube opening 89 to top tube opening 91. Tube channel structure 66 is adapted for holding a tube 85 by means of a clamping effect caused by joining the molded cover and backing components 57, 58. A left external reference marking 61 is located on the tube channel structure 66 in alignment window 59, and a right external reference marking 62 is located on the edge of tube channel structure 66 opposite the left external reference marking 61. The external markings 61, 62 are aligned with a reference electrode (not shown). In this embodiment, alignment window 59 enables placement of external reference markings 61, 62 on edges of tube channel structure 66 adjacent reference electrode (not shown), in contrast to edges of housing unit 54 as in the prior art; the increased proximity between external reference markings 61, 62 minimizes loss of precision caused by rotational mis-adjustments (skewed placement) when affixing housing unit 54 to a reference structure 71. In addition, increased proximity enhances level device accuracy by permitting greater ease in using both external marks for alignment purposes; in prior art devices, the greater distance separating the external reference marks 61, 62 often renders impossible or impractical the use of both external reference markings for alignment purposes, and typically alignment to only one (external reference marking) is performed.

Referring back to FIG. 3, the molded cover component 57 has on-off switch 77 positioned left of alignment window 59, and speaker holes 75 positioned below on-off switch to allow emission of audible signals. At the top and bottom center of housing unit are means for affixing level device to a reference structure to prevent accidental rotation or skewing of the level device during use. In this embodiment, the top center affixing means consists of a center hole 68 with a notch located at the top center of the hole; the bottom center affixing means consists of indented groove 69 adapted for receiving a nail, screw or other elongated hardware. The molded cover and backing components 57, 58 each have upper tube clamp 79 and lower tube clamp 73 for holding working-end 81 of tube 85 for convenient storage purposes. Molded plastic clamps 83 are used to clamp the hose ends to prevent fluid leakage when the level device 51 is not in use.

Figure 4:
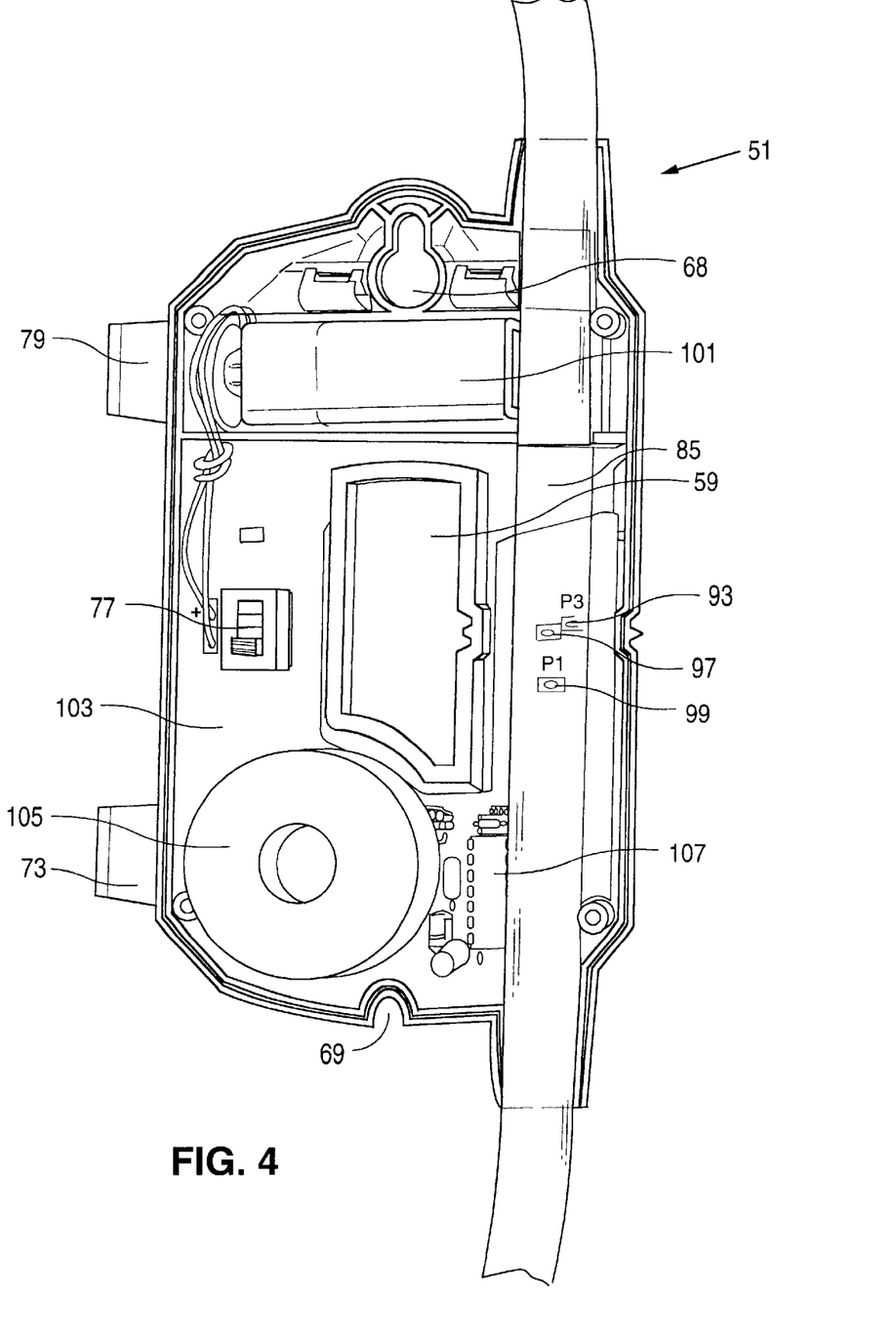
FIG. 4 illustrates a fluid-actuated level device according to one embodiment with the molded front cover removed.
Figure 5:
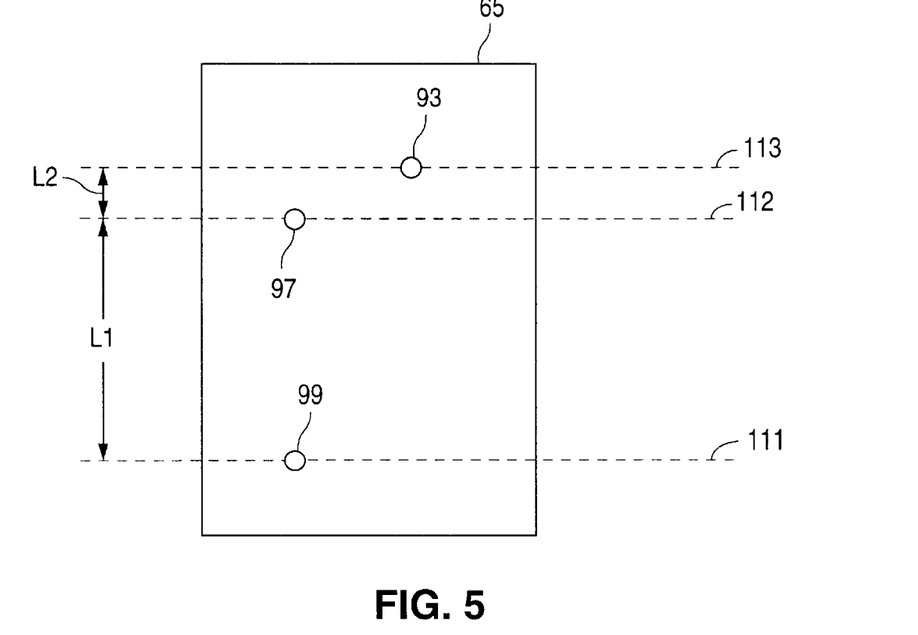
FIG. 5 illustrates a tube window according. to one embodiment.

FIG. 4 illustrates a level device with the molded cover component removed according to one embodiment. An energy source 101, in one embodiment a conventional nine volt battery, is positioned above alignment window 59 and connected to on-off switch 77 on circuit board 103. Also connected to circuit board 103 are signal generator 105, amplifier means 107, and electrodes 93, 97, 99. FIG. 5 illustrates a tube window 65 according to one embodiment. Tube window 65 comprises a rectangular cut-out portion in the tube channel structure 66 (FIG. 3) positioned between external reference markings 61, 63 (FIGS. 3). Tube window 65 permits viewing of the tube 85 and the electrodes 93, 97, 99 penetrating the tube 85. Electrodes 93, 97, 99 are aligned as shown in FIG. 5. Base electrode 99 is located below reference electrode 97 in tube 85, and reference electrode 97 is located below and to the left of overshoot electrode 93. As shown in FIG. 5, the length L1 between base electrode 99 and reference electrode 97 is approximately one-third inch, and the length L2 between reference electrode 97 and overshoot electrode 93 approximately one-sixteenth inch. Other embodiments may position the electrodes at a variety of lengths and orientations from one another, and may employ a variety of energy sources, and a variety of tube window shapes.

In operation, base electrode 99 and reference electrode 97 operate as a first switch, and base electrode 99 and overshoot electrode 93 operate as a second switch, for permitting energy from energy source 101 (FIG. 4) to drive signal generator 105 (FIG. 4). In this embodiment, a continuous sound is generated by signal generator 105 in response to current from the first switch (reference signal); the same continuous sound is then rendered intermittent in response to current from the second switch (hereafter, overshoot signal). Thus, when fluid-level is raised in reference-end 82 (FIG. 3) in response to vertical movement of the working-end 81 (FIG. 3), fluid submerges first the base electrode 99 and then the reference electrode 97. When contact is made with the reference electrode 97, the level device emits a reference signal. If the worker continues to raise the fluid-level in the working-end, the conductive fluid eventually rises to make contact with the overshoot electrode 93, resulting in emission of the overshoot signal. The change from the continuous steady sound of the reference signal to the intermittent sound of the overshoot signal thus notifies the worker that the working-end is positioned too high, and must be lowered to ensure measuring precision. The overshoot electrode 93 thus enables greater measuring precision to be achieved in situations where a worker, due to, e.g., carelessness, fatigue or uneven terrain, moves the working-end too high after hearing the reference signal. In addition, when the level device is used over long distances—and especially with tubing of narrow diameter—a delay occurs before the fluid in the reference-end settles to accurately reflect the fluid-level in the working-end 81; this delay results in a delayed reference signal that leads a worker to a measuring point that has overshot the reference plane. The overshoot electrode solves this problem by quickly alerting the worker by the overshoot signal 93 that his measuring point is too high relative to the reference plane, and that he must lower the working-end 81 until the overshoot signal converts back to the reference signal. Other embodiments may employ different sounds and signaling means, for example, light emissions. Other embodiments may also form a second switch between the reference and overshoot electrodes 97, 93.

As shown in FIG. 5, use of tube window 65 enables a worker to rapidly learn how to operate the level device. In particular, a worker may inspect through tube window 65 how the reference signal and overshoot signal correlate to fluid-levels in relation to the reference electrode 97 and the overshoot electrode 99 (as well as the external reference markings 61, 63 (FIG. 3)). In addition, tube window 65 has the further advantage of enabling a worker to visually identify when level device functioning degrades due to the wicking effect caused by fluid deposit accumulation around the electrodes. Lastly, tube window 65 enables a worker to clean the reference-end and electrodes without removing the tube from the housing unit and without damaging the electrodes.

Figure 6:
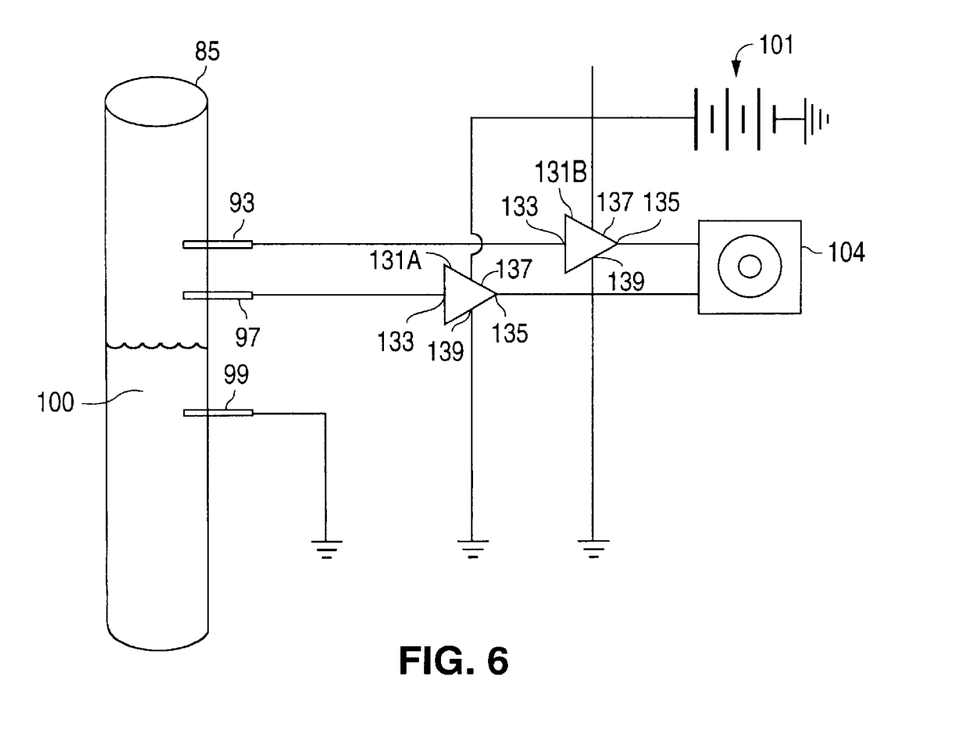
FIG. 6 is a schematic diagram illustrating an apparatus for emitting signals upon detection of fluid-levels according to one embodiment.

FIG. 6 is a schematic diagram illustrating an apparatus for emitting signals upon detection of fluid-levels according to one embodiment. When conductive fluid 100 submerges the base electrode 99 and the reference electrode 97, a current is passed between the base and reference electrodes 99, 97 which is detected by amplifier 131A. After amplifier 131A detects a current from the reference electrode 97, current is passed from energy source 101 through output terminals 135 to signal generator 104. Signal generator 104 then emits a reference signal consisting of a steady, uniform audible sound. When conductive fluid 100 submerges the base electrode 99 and the overshoot electrode 93, a current is passed between the base and overshoot electrodes 99, 93 which is detected by amplifier 131B. When amplifier 131B detects a current from the overshoot electrode 93, current is passed from energy source 101 through output terminals 135 to signal generator 104. Signal generator 104 then emits an overshoot signal consisting of the sound of the reference signal rendered intermittently. Energy source 101 is connected to the power supply terminals 137 and ground terminals 139 of amplifiers 131A, 131B.

Figure 7:
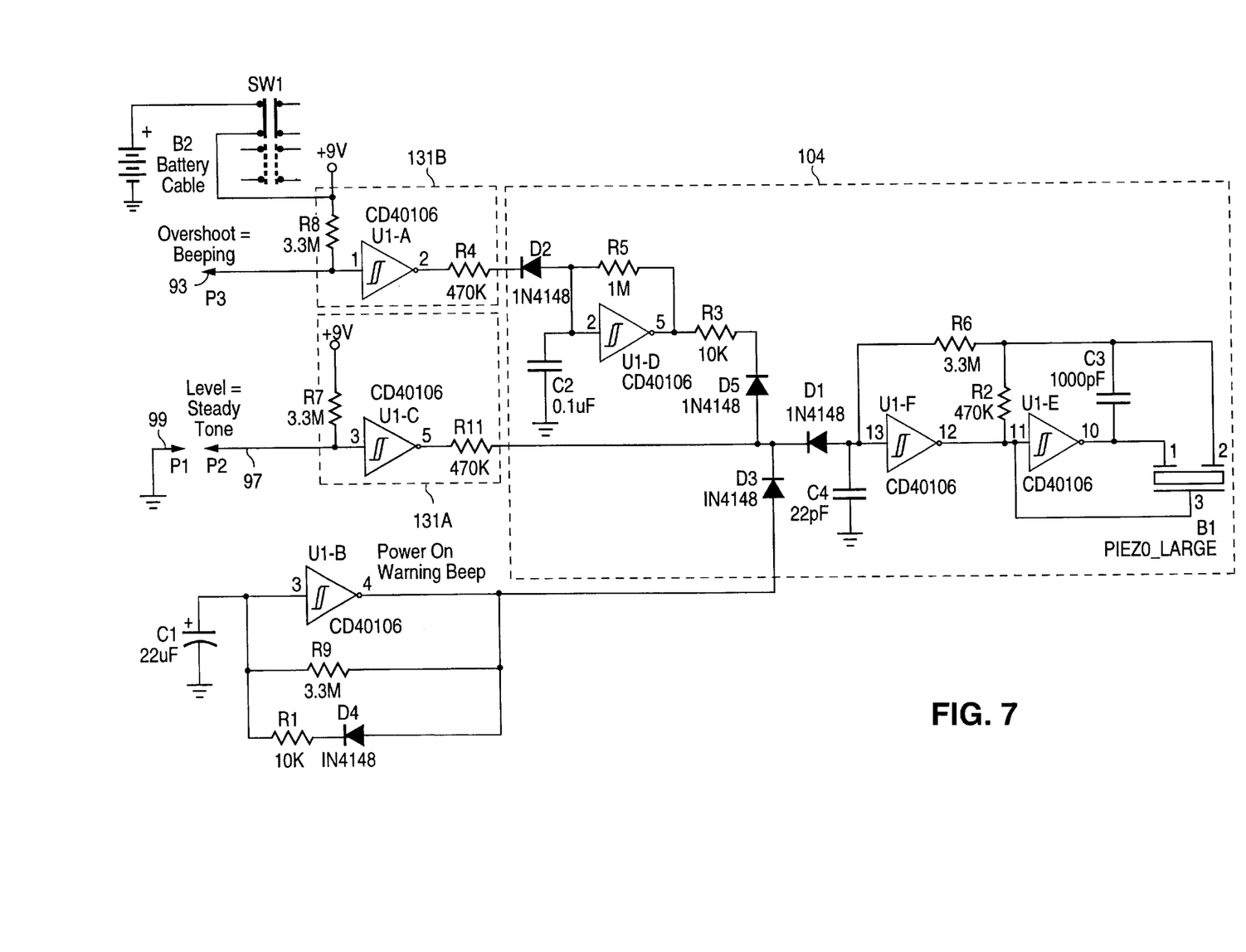
FIG. 7 is a circuit diagram of an apparatus for emitting signals upon detection of fluid-levels according to one embodiment.
Figure 8:
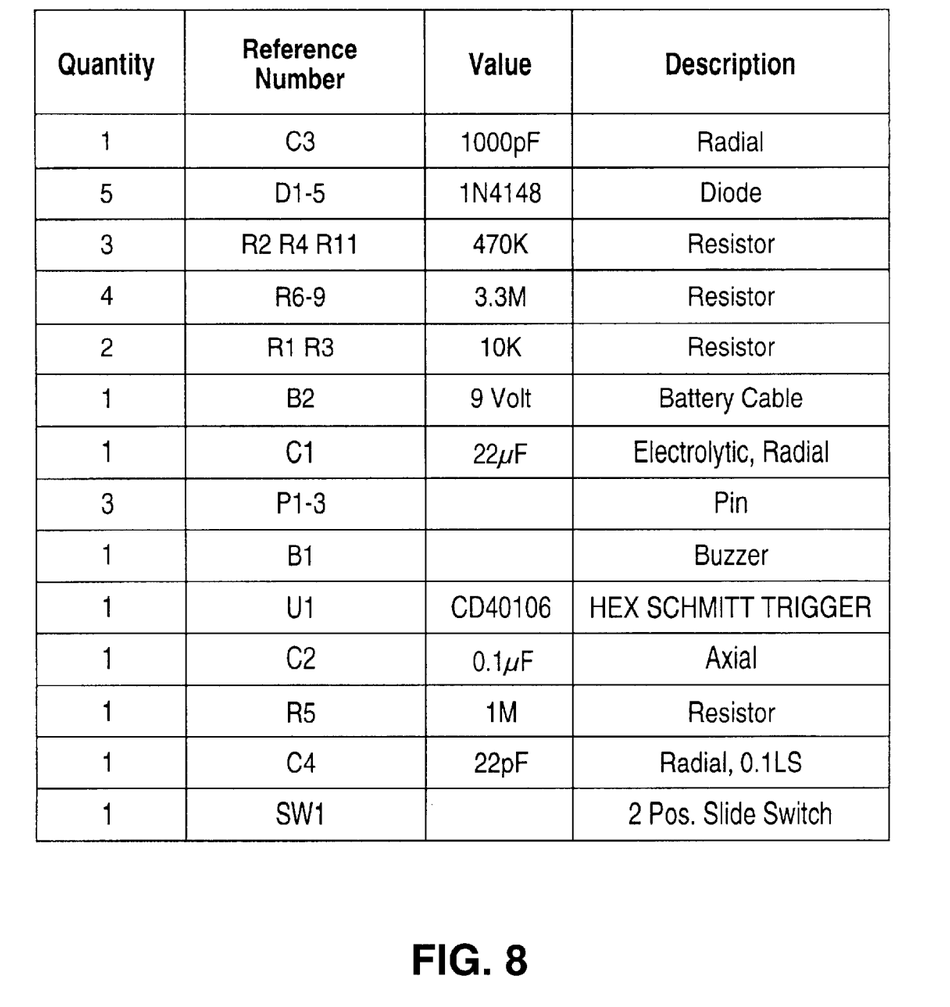
FIG. 8 is a parts list for the circuit shown in FIG. 7.

FIG. 7 provides a circuit diagram of an apparatus for emitting signals upon detection of fluid-levels according to one embodiment. The circuitry may be implemented by using, for example, a CD40106 Hex Schmitt Trigger manufactured by National Semiconductor of Arlington, Tex. Base electrode 99 is connected to ground, reference electrode 97 is connected to amplifier 131A, and overshoot electrode is connected to amplifier 131B. Amplifiers 131A and 131B use identical circuitry. Amplifier 131A comprises a Schmitt Trigger U1-C with inputs from resistor R7, connected to a 9 volt power source, and from reference electrode 97. Amplifier 131B comprises a Schmitt Trigger U1-A with inputs from resistor R8, connected to a nine volt power source, and from overshoot electrode 93. Signal generator 104 takes inputs from amplifiers 131A, 131B. Signal generator 104 uses three Schmitt Triggers U1-D, U1-E, U1-F, four resistors R2, R3, R5, R6, three capacitors C2, C3, C4, four diodes DI, D2, D3, D5 and a buzzer B1 connected as shown in FIG. 7. FIG. 8 is a parts list describing the quantity, value, reference number, and description of the parts in the circuit shown in FIG. 7. Numerous embodiments for implementing amplifiers 131A, 131B and signal generator 104 are known in the art, and the present disclosure is not limited to the one described herein.

Figure 9:
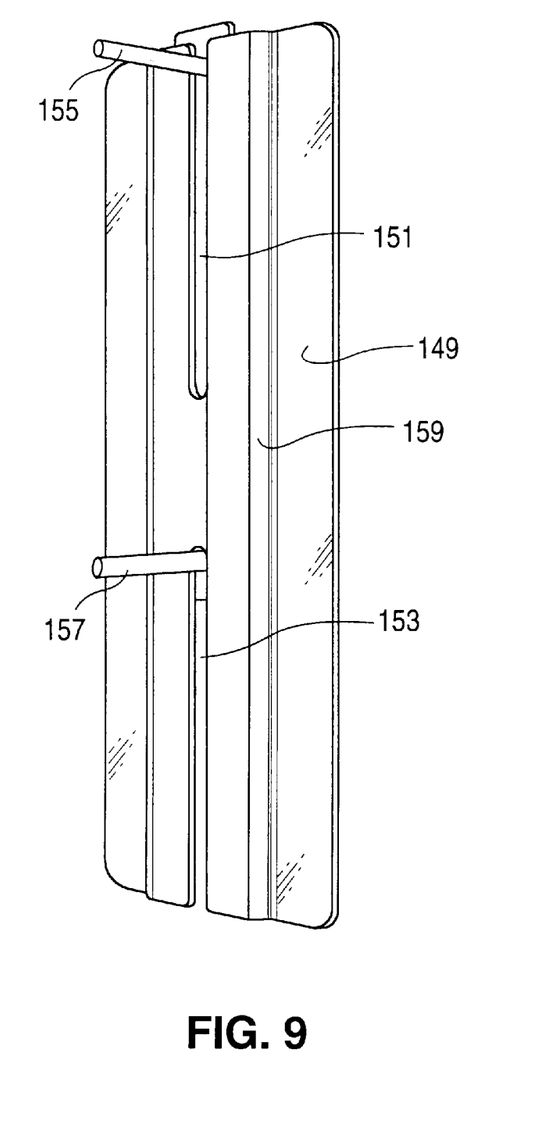
FIG. 9 is a perspective view of a slidable backing assembly according to one embodiment.
Figure 10:
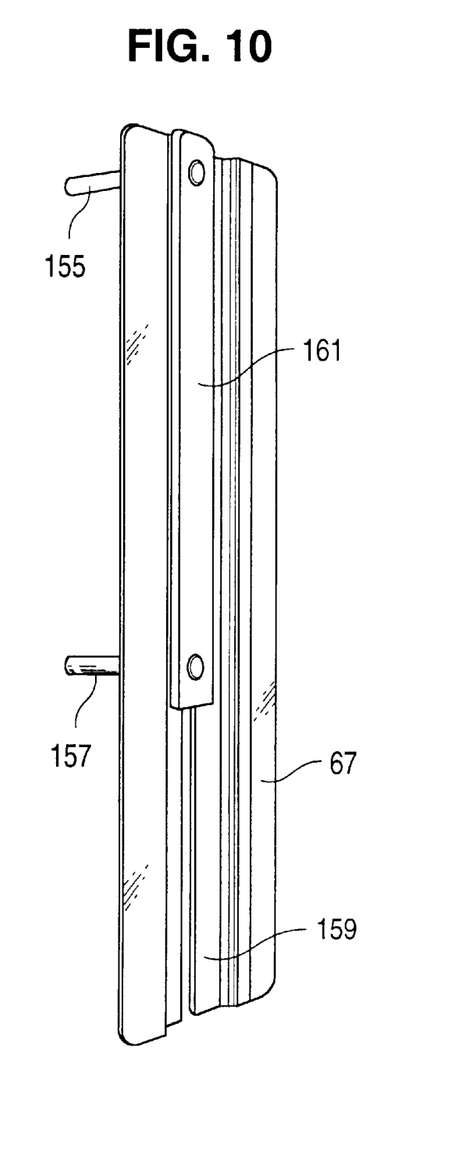
FIG. 10 is another perspective view of a slidable backing assembly according the one embodiment.

As shown in FIG. 3, housing unit may be attached to a slidable backing assembly 67 having a plurality of attachment holes 91 for conveniently affixing level device 51 to a structure. FIG. 9 illustrates a perspective view of a slidable backing assembly 67 according to one embodiment. In this embodiment, the slidable backing assembly 67 consists of a backing plate 149 with an upper stem canal 151, a lower stem canal 153, and a backing channel 159 running vertically through the center of backing plate 149. An upper threaded stem 155 projects through upper stem canal 151, and a lower threaded stem 157 projects through lower stem canal 153. Threaded stems 155, 157 are used to connect housing unit 54 (FIG. 3). FIG. 10 illustrates another perspective view of a slidable backing assembly 67 according to one embodiment. Threaded stems 155, 157 are connected to rectangular stem holder 161. Rectangular stem holder 161 is adapted to slide vertically in backing channel 159. In this embodiment, rectangular stem holder 161 and backing plate 149 each consist of a single piece of sheet metal.

Figure 11:
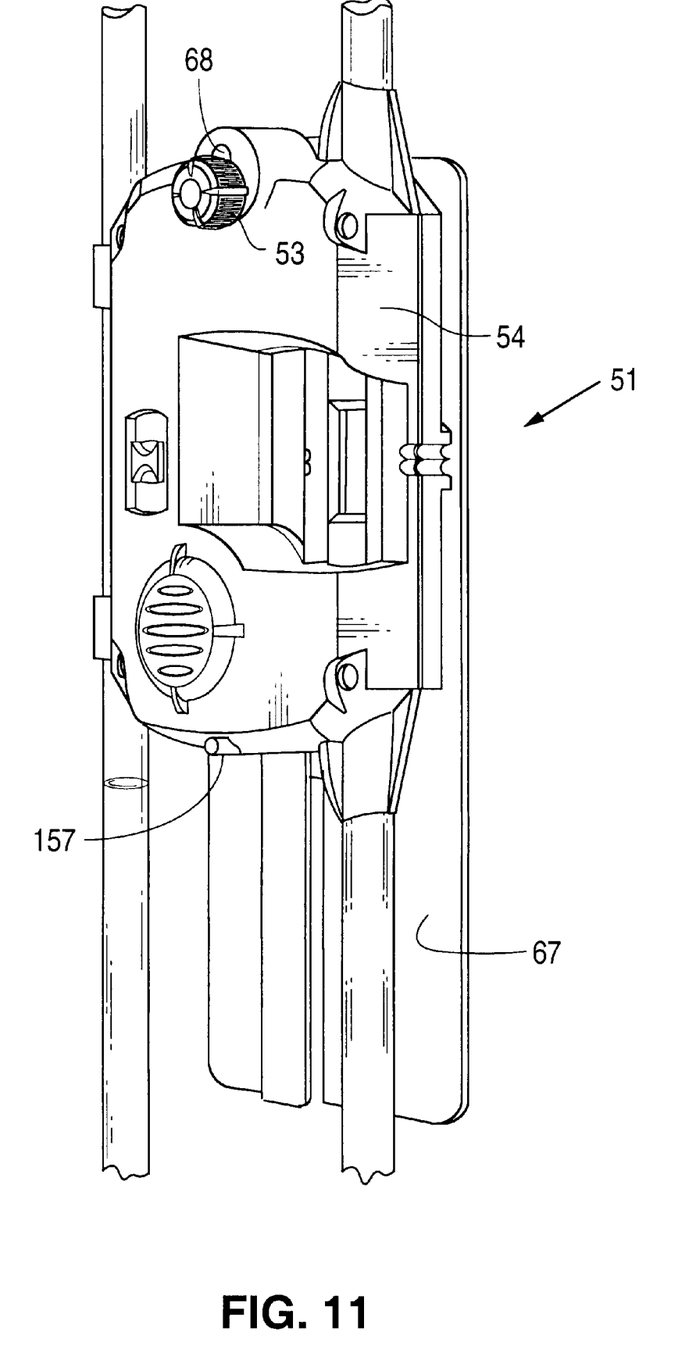
FIG. 11 illustrates a housing unit connected to a slidable backing assembly according the one embodiment.

FIG. 11 illustrates a housing unit connected to a slidable backing assembly 67 according to one embodiment. Housing unit 54 is aligned between upper threaded stem (not visible) and lower threaded stem 157. Lower threaded stem 157 is inserted through indented groove 69, and upper threaded stem is inserted through center hole 68 and attached by nut 53. In operation, nut 53 is tightened on upper threaded stem, compressing housing unit 54 to slidable backing assembly 67. When nut 53 is loosened, housing unit 54 may be adjusted vertically to any position permitted by the stem canals (FIG. 8) in which the threaded stems slide. This permits alignment of the level device 51 to a high degree of accuracy. Referring back to FIG. 3, a worker typically applies a reference mark 63 to a structure 71. Without a slidable backing assembly 67, the connecting means 68, 69 of housing unit 54 must be carefully aligned to reference mark 63. Even after careful alignment, however, a worker (from, e.g., carelessness or fatigue) may improperly attach screws or nails to the structure for affixing the housing unit 54, thus causing measuring errors. Use of slidable backing assembly 67 enables a worker to quickly affix the slidable backing assembly 67 in an approximate relationship to the reference mark 63; housing unit 54 may then be fine-tuned to the reference mark 63 by loosening nut 53 and moving the housing unit 54 along a vertical continuum permitted by slidable backing assembly 67. In addition, without the slidable backing assembly 67, housing unit 54 is typically affixed to a structure using the center hole 68 and indented groove 69, located at the top and bottom of housing unit 54. Often, however, a proposed reference plane is located above or equal to the surface of an affixing structure; in this situation, the center hole 68 cannot be used to affix the housing unit 54, and the housing unit 54 cannot therefore be properly attached. Use of the slidable backing assembly 67 extends the vertical reach of the housing unit 54 to remedy this situation. For example, housing unit 54 may be securely affixed to the structure by merely affixing the lower portion of the slidable backing assembly 67 to the structure. If the reach provided in this manner is still insufficient, the housing unit 54 may be adjusted in the slidable backing assembly 67 an additional amount to reach a significant range of reference points lying above a given structure.

Figure 12:
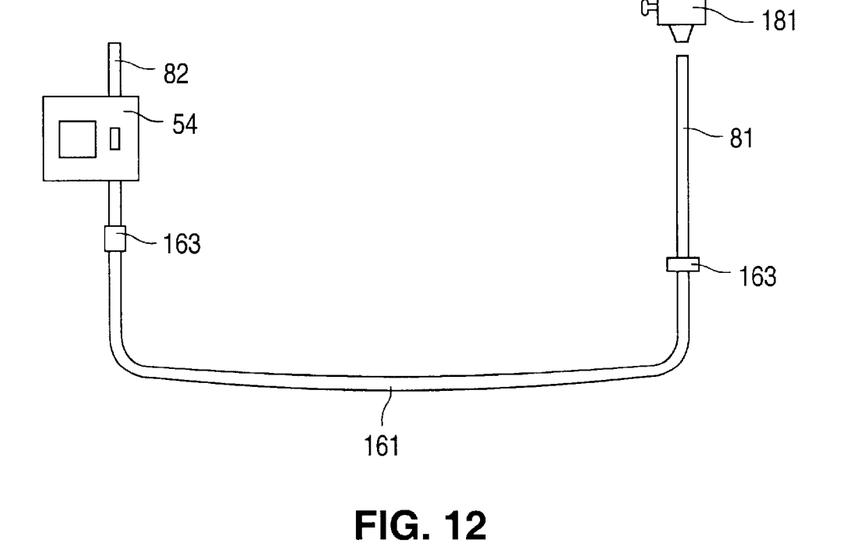
FIG. 12 illustrates the apparatus implementing a non-transparent tube section according to one embodiment.

FIG. 12 illustrates the apparatus implementing a non-transparent tube section according to one embodiment. In this embodiment, non-transparent hose 161 is coupled at each end to lengths of transparent tubing constituting the reference-end 82 and working-end 81; the resulting tube will be referred to as the tube assembly. Reference-end 82 and working-end 81 are coupled to non-transparent hose 161 using conventional hose adapters 163. Conventional, inexpensive garden hose may be used as non-transparent tube 161 to substantially increase the distances at which level device 51 may discover level points for minimal cost. A drawback, however, to using non-transparent tubing 161 is that air-bubbles—which degrade the accuracy of the level device—are not detectable through the non-transparent walls of the tube. Thus, the use of inexpensive, non-transparent hose is typically discouraged. A method is provided for implementing a non-transparent tube section by means of water-filler 181.

Figure 13:
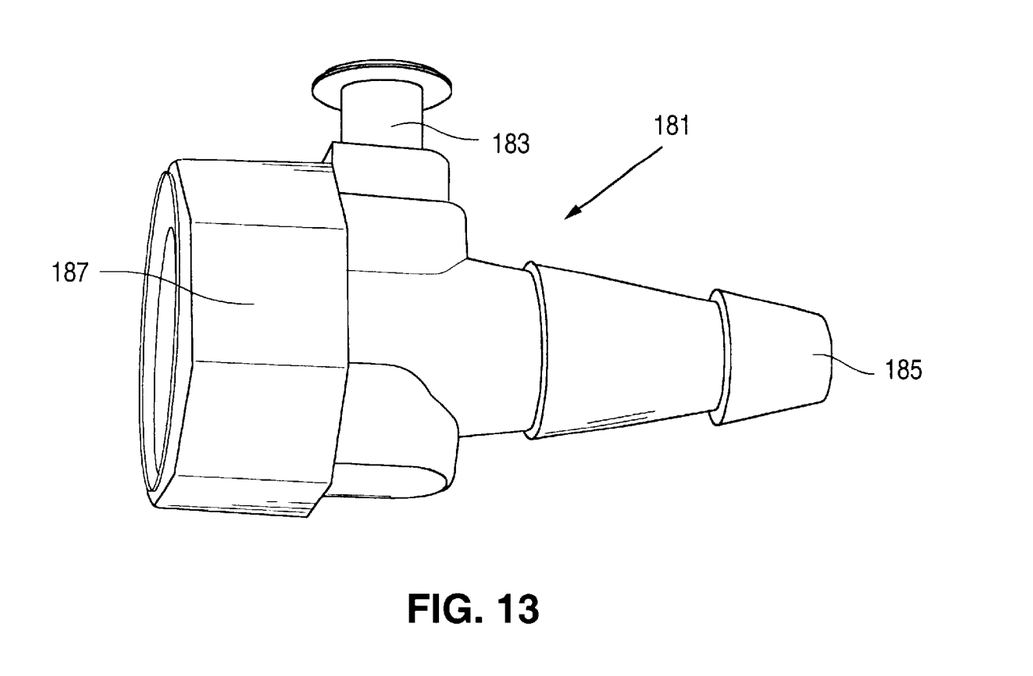
FIG. 13 illustrates a water-filler according to one embodiment.

FIG. 13 illustrates a water-filler according to one embodiment. Water-filler 181 has an adapter 187 for attaching to a water source (typically a faucet), a nozzle 185 for insertion into transparent hose end for filling hose, and a flow control valve 183. Referring to FIGS. 12–13, the tube assembly may be safely filled without trapping water-bubbles using the following method: first, attaching two transparent tube lengths 81, 82 to the ends of non-transparent tube 161 by means of conventional hose adapters 163; second, attaching an open end of one transparent tube length, typically the working-end 81, to the nozzle 185 of water-filler 181; third, opening flow control valve 183 to permit pressurized water to flow through tube assembly; and fourth, closing flow control valve 183 after air-bubbles are no longer visible exiting the other end of the tube assembly, typically the reference-end. In this manner, air-bubbles may be flushed from the tube assembly by means of continuous water pressure applied to the tube assembly end. In general, any conventional fluid filler device adapted for insertion into a hose end is suitable; one such water-filler device is manufactured by the National Latex Products Company of Ashland, Ohio, and sold in a product called Splash Baseball™ with UPC number 7506003802.

I claim:

1. A fluid-actuated level device comprising:
    a tube;
    a housing unit connected to one end of the tube, the housing unit including:
        a tube channel structure through which the tube passes;
        an alignment window defining an opening within a perimeter of the housing unit adjacent to the tube channel structure; and
        at least one external reference mark positioned on an edge of the tube channel structure adjacent the alignment window.

2. The apparatus of claim 1, further comprising a slidable backing assembly attached to the housing unit.

3. The apparatus of claim 1, wherein the at least one external reference mark includes a first external reference mark positioned on an edge of the tube channel structure adjacent the alignment window and a second external reference mark positioned on an opposite edge of the tube channel structure.

4. The apparatus of claim 1, wherein the device includes a plurality of electrodes which are visible in the tube.

5. The apparatus of claim 4, wherein the plurality of electrodes includes an overshoot electrode.

6. A fluid-actuated level device comprising:
    a tube;
    a housing unit connected to one end of the tube, the housing unit comprising:
        a plurality of electrodes inserted in the tube including a base electrode, a reference electrode and an overshoot electrode; and;
        a signal generator connected to the reference electrode and the overshoot electrode;
    wherein the signal generator is operative to emit a reference signal associated with the reference electrode and an overshoot signal associated with the overshoot electrode, and further wherein the reference signal is a first type of tone, and the overshoot signal is a second type of tone different than the first type of tone; wherein the housing unit includes:
        an alignment window defining an opening within a perimeter of the housing unit adjacent to a tube channel structure; and
        at least one external reference mark that includes an external reference mark positioned inside the alignment window.

7. The apparatus of claim 6, further comprising a slidable backing assembly attached to the housing unit.

8. The apparatus of claim 6, wherein the housing unit includes a tube channel structure, the tube channel structure further including a tube window.

9. The apparatus of claim 6, wherein signal generator emits a reference signal, and an overshoot signal that is distinct from the reference signal.

10. The apparatus of claim 6, wherein the reference signal is a continuous tone and the overshoot signal is an intermittent tone.

11. The apparatus of claim 6, wherein the housing unit includes an external reference mark and the tube is adjacent to the external reference mark.

12. A fluid-actuated level device comprising:
a tube;
a housing unit connected to one end of the tube, the housing unit comprising:
a plurality of electrodes inserted in the tube including a base electrode, a reference electrode and an overshoot electrode; and;
a signal generator connected to the reference electrode and the overshoot electrode;
wherein the signal generator is operative to emit a reference signal associated with the reference electrode and an overshoot signal associated with the overshoot electrode, and further wherein the reference signal is a first type of tone, and the overshoot signal is a second type of tone different than the first type of tone; wherein the housing unit includes:
an alignment window within a perimeter of the housing unit adjacent to a tube channel structure;
at least one external reference mark positioned on an edge of the tube channel structure adjacent the alignment window; and
a tube channel structure, the tube channel structure further including a tube window.

13. A fluid-actuated level device comprising:
a tube;
a housing unit connected to one end of the tube, the housing unit including:
an alignment window defining an opening within a perimeter of the housing unit adjacent to a tube channel structure;
at least one external reference mark positioned on an edge of the tube channel structure adjacent the alignment window; and
a tube channel structure through which the tube passes, wherein the tube channel structure defines a tube window through which the interior of the tube is visible.

14. The apparatus of claim 13, wherein the external reference mark positioned on an edge of the tube channel structure adjacent the alignment window is aligned with the tube window.

15. The apparatus of claim 14, wherein the at least one external reference mark includes a first external reference mark positioned on an edge of the tube channel structure adjacent the alignment window and a second external reference mark positioned on an opposite edge of the tube channel structure, wherein the first and second external reference marks are aligned with the tube window.

* * * * *